(12) United States Patent
Murphy et al.

(10) Patent No.: US 9,994,164 B2
(45) Date of Patent: Jun. 12, 2018

(54) INTERCHANGEABLE DISPLAY SYSTEM FOR ART ORNAMENTS ON MOTOR VEHICLES

(71) Applicant: Car Shark USA, LLC, Woodbridge, VA (US)

(72) Inventors: Mark Murphy, Woodbridge, VA (US); Peter Penn, Pittsburgh, PA (US)

( * ) Notice: Subject to any disclaimer, the term of this patent is extended or adjusted under 35 U.S.C. 154(b) by 0 days. days.

(21) Appl. No.: 15/059,918

(22) Filed: Mar. 3, 2016

(65) Prior Publication Data
US 2017/0253193 A1    Sep. 7, 2017

(51) Int. Cl.
*G09F 21/04* (2006.01)
*B60R 13/00* (2006.01)

(52) U.S. Cl.
CPC .............. *B60R 13/00* (2013.01); *G09F 21/04* (2013.01)

(58) Field of Classification Search
CPC ....................... G09F 2021/041; Y10T 24/4578
USPC ............................. 40/592; D12/412; 24/663
See application file for complete search history.

(56) References Cited

U.S. PATENT DOCUMENTS

| | | | |
|---|---|---|---|
| 2,559,163 A * | 7/1951 | MacDonald | ............ B60R 13/10 340/468 |
| 4,667,428 A * | 5/1987 | Elmer | ..................... G09F 21/04 40/592 |
| 4,787,163 A * | 11/1988 | Berg | ....................... G09F 21/04 40/464 |
| D368,463 S | 4/1996 | Kazenelson | |
| 5,918,397 A * | 7/1999 | Elmer | ..................... G09F 21/04 40/572 |
| 5,939,155 A | 8/1999 | Voznick | |
| 6,056,425 A * | 5/2000 | Appelberg | ........... B60Q 1/2611 362/493 |
| 6,082,880 A | 7/2000 | Nerlino | |
| 6,129,035 A * | 10/2000 | Schweinberger | ...... B60Q 1/482 116/173 |
| D480,432 S | 10/2003 | Newman | |
| 7,147,399 B2 | 12/2006 | Viscount | |
| 7,624,957 B2 | 12/2009 | Klein | |
| 8,470,414 B2 | 6/2013 | Custer | |
| RE44,480 E | 9/2013 | Elmer | |
| D718,212 S | 11/2014 | Fetta | |
| 2010/0310794 A1 | 12/2010 | Nordvik | |

* cited by examiner

Primary Examiner — Joanne Silbermann (57) ABSTRACT

A display system that temporarily but securely displays a variety of large-sized interchangeable display objects atop vehicle rooftops for eye-catching public broadcast. The display system comprises a display object and a common, reusable base. The display object combines an art ornament with a display object connection assembly that matingly connects to a base connection assembly without the use of tools. The base is releasably secured to vehicle rooftops using an array of magnets. Intended for personal use, the display system is designed to be more convenient and aesthetic than commercial displays allowing users to display a variety of interchangeable display objects with associated art ornaments, communicating different messages based on changes in the seasons, their activities and interests, their mood, or other factors.

15 Claims, 11 Drawing Sheets

INTERCHANGEABLE DISPLAY SYSTEM FOR ART ORNAMENTS ON MOTOR VEHICLES

TECHNICAL FIELD

Embodiments of the subject matter disclosed herein generally relate to methods and systems for displaying objects on motor vehicles and, preferably and more particularly, to methods and systems for enabling art ornaments to be interchangeably displayed on motor vehicle rooftops.

BACKGROUND

Motor vehicle owners often personalize their vehicles to express themselves. Examples of articles used to personalize motor vehicles include bumper stickers, window decals, window flags, decorative windshield sun shades, magnetic signs, vanity license plates, dashboard figurines, antenna toppers, custom hood ornaments, and rear view mirror hanging decorations. Many of these articles are challenged by limited visibility, unclear messaging, and unremarkable impact on the intended audiences, particularly when briefly viewed on a moving vehicle. Motor vehicle owners who desire vehicle personalization articles that are quickly understood and are more impressive and attention-grabbing for the conveyance of their public broadcast must settle for these conventional articles.

Vehicle rooftops provide a prominent location for display purposes due to their height and unobstructed visibility by pedestrians and other drivers. Additionally, vehicle rooftops can accommodate large displays without obstructing the view of the driver. Unfortunately, displays mounted on vehicle rooftops are fully subjected to forces induced by wind and vehicle motion. To promote durability and safety, vehicle rooftop displays are typically mounted in a permanent fashion using adhesives, mechanical fasteners, or frames. These permanent mounting methods are used on taxis and other commercial vehicles but are typically unappealing to private vehicle owners. Alternative displays such as stickers, small vehicle decorations, and signs made from flat magnetic sheets reduce the impact of external forces by limiting the exposed surface area but these alternatives do not achieve the same visual impact as large rooftop displays.

Presently, the prominent rooftop displays that are both conveniently removable and resistant to environmental and driving forces are commercial rooftop signs, typically used by companies that incorporate the use of private vehicles in the delivery of their commercial products or services. A common example is rooftop signs used in conjunction with pizza delivery services.

While these commercial rooftop signs are both visible and removable, they typically rely on text or flat images to communicate their message but not their shape. Simple, common shapes are routinely reused for many different purposes and messages. Even when the shape of the sign is linked to the message, that shape is static and cannot be easily modified without replacing the entire display system.

While suitable for a commercial entity that has a single, consistent brand or message, current vehicle display options are not well suited to individuals who desire a more interesting, more artistic display and who are interested in communicating different messages based on changes in the seasons, their activities and interests, their mood, or other factors. Purchasing a new display system each time a change is desired is neither convenient nor affordable for most individuals. There has been no safe, convenient, affordable, and flexible way to blend the highly visible location offered by a vehicle rooftop with the versatile and stylish vehicle personalization needs of individual vehicle owners.

Accordingly, it would be desirable to provide display systems and methods that avoid the afore-described problems and drawbacks.

SUMMARY

According to an embodiment, a display system includes: a base having a plurality of magnets attached thereto and distributed around a perimeter of the base; a flat base platform forming an upper structural platform surface of said base; curved sides connected to the perimeter of the base forming a skirt around said flat base platform, wherein portions of a lower edge of said curved sides are contoured to accommodate curvature of a vehicle rooftop to which said base can be attached via said plurality of magnets; and a display object connected to the base.

According to another embodiment, a display system kit includes (a) a base having a plurality of magnets attached thereto and distributed around a perimeter of the base; a flat base platform forming an upper structural surface of said base; and curved sides connected to the perimeter of the base forming a skirt around said flat base platform, wherein portions of a lower edge of said curved sides are contoured to accommodate curvature of a vehicle rooftop to which said base can be attached via said plurality of magnets; and (b) a display object connectable to the base.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar assemblys. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems provide for a display system for motor vehicles including a base 10 and a display object 19. The base 10 firmly, yet removably, mounts on ferromagnetic vehicle rooftops. The display object connection assembly 11 securely connects interchangeable display objects 19 to the base 10.

A first embodiment of the display system is illustrated in FIGS. 1, 2, 3A, 3B, 4, 5, 6A, 6B, 6C, and 6D. The display system according to this embodiment comprises two assemblies, a base 10 and a display object 19.

Figure 1:
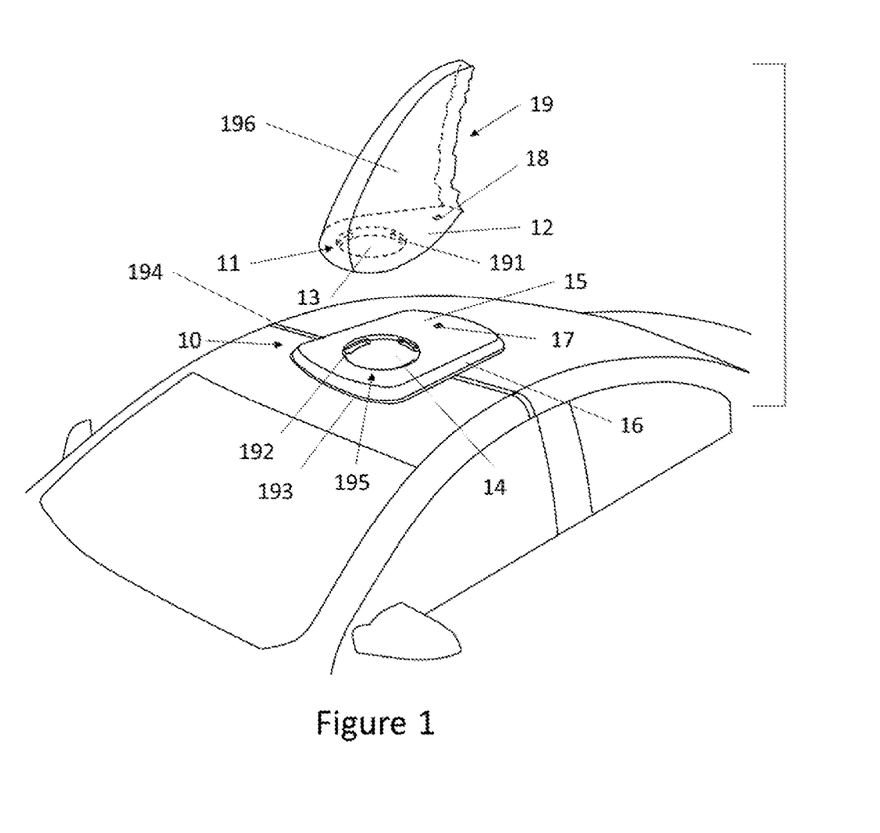
FIG. 1 is a perspective view of an embodiment of the display system atop a vehicle. The exemplary art ornament depicted is a shark fin.
Figure 3A:
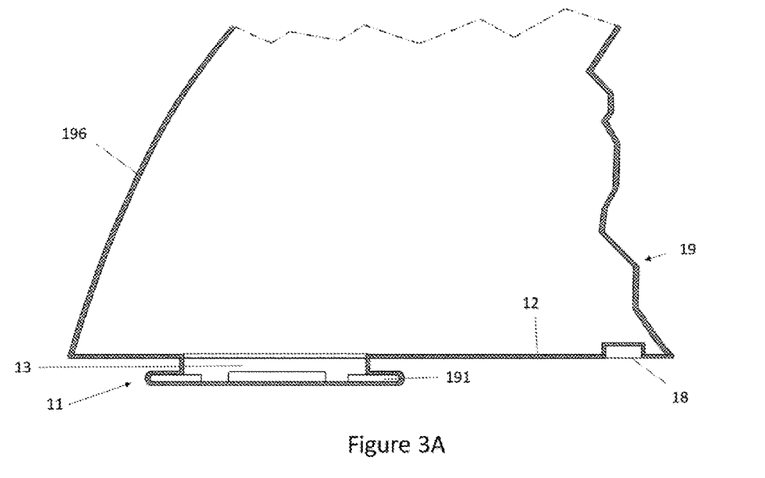
FIG. 3A is a cross section view of the display object taken at the sectioning plane and in the direction indicated by section lines 3A-3A in FIG. 2.
Figure 3B:
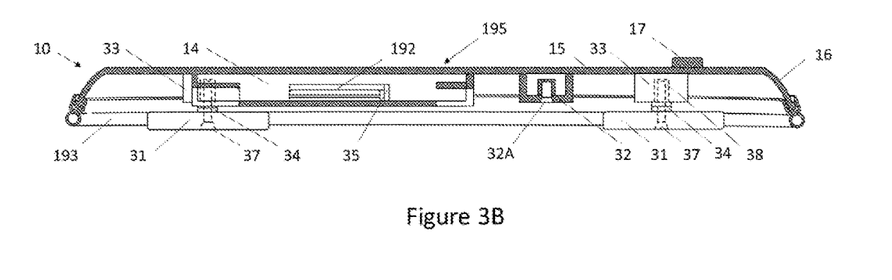
FIG. 3B is a cross section view of the base taken at the sectioning plane and in the direction indicated by section lines 3B-3B in FIG. 2.

The base 10 is mounted on a ferromagnetic vehicle rooftop using dish-shaped magnets 31 with a soft coating to protect painted metal surfaces. The base 10 provides a framing structure supporting a recessed receiving cavity 14. The upper surface of the base 10 is generally flat, comprising a flat base platform 15 with a plurality of rounded corners. Downward outwardly curved sides 16 skirt the peripheral edges of the flat base platform 15. In this context, as seen in FIGS. 1 and 3B, the phrase "downward outwardly curved" is intended to reflect a family of curved surfaces which incrementally extend further outward (e.g., relative to a center of the base 10) over at least a portion of the surface as the surface progresses from the top to the bottom of the base 10, sides 16 being one example of such an aerodynamic surface. A gasket 193, made from rubber or a similar compressible material, attached to the bottom of the curved sides 16 reduces or eliminates the gap between the lower perimeter of the base 10 and the vehicle rooftop and provides additional protection against abrasion of painted metal surfaces. The gasket 193 also substantially conceals the distributed magnets 31 from external view when the display system is mounted on the vehicle rooftop. In this embodiment the base 10 is shaped as a rigid shell structure open at the bottom with a slight curvature to the bottom edge to accommodate the curvature of the typical vehicle rooftop.

The base 10 of this embodiment of the display system may be produced using a variety of plastic fabrication methods but is well suited to vacuum forming. An alternative construction of the base 10 uses a rigid hollow structure resulting in a base 10 that is not open at the bottom. In this configuration, the magnets 31 are attached directly to the bottom of the base without the use of base extensions 33. The base 10 with a rigid hollow structure may be produced using a variety of plastic fabrication methods but is well suited to blow molding or injection molding. Additionally, as seen in the figures, the base 10 has a low height to longitudinal length ratio which, in combination with its curved sides 16, forms a low cross sectional profile which is substantially aerodynamic.

The display object connection assembly 11 in this embodiment utilizes a plurality of cylindrical projection tabs 191 and 191A that serve as engaging devices on the cylindrical projection 13. The base connection assembly 195 utilizes a plurality of recessed receiving cavity tabs 192 and 192A that serve as mating engaging devices on the recessed receiving cavity 14. In combination, the display object connection assembly 11 and the base connection assembly 195 provide the means for fittingly connecting the display object 19 to the base 10. The display object connection assembly 11 and base connection assembly 195 cooperate to establish a snug fit with significant contact surface area between said display object 19 and said base 10 to distribute load and transmit external forces encountered by the interchangeable art ornament 196, e.g., when the vehicle to which it is mounted is moving. The display object connection assembly 11 may be produced using a variety of plastic fabrication methods including vacuum forming, blow molding, or injection molding. Note that the present invention is not limited to this particular mechanism for removably connecting the display object 19 to the base 10, and that other such mechanisms are described below.

Figure 6A:
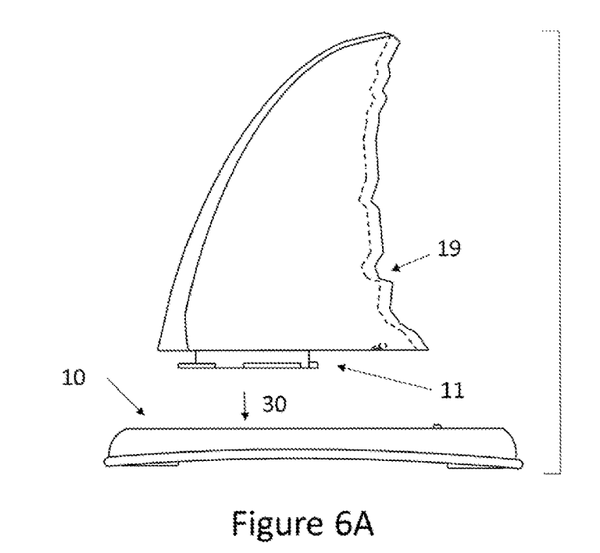
FIG. 6A is a side view of the base and display object of FIG. 1 showing the display object positioned appropriately for insertion into the base.
Figure 6B:
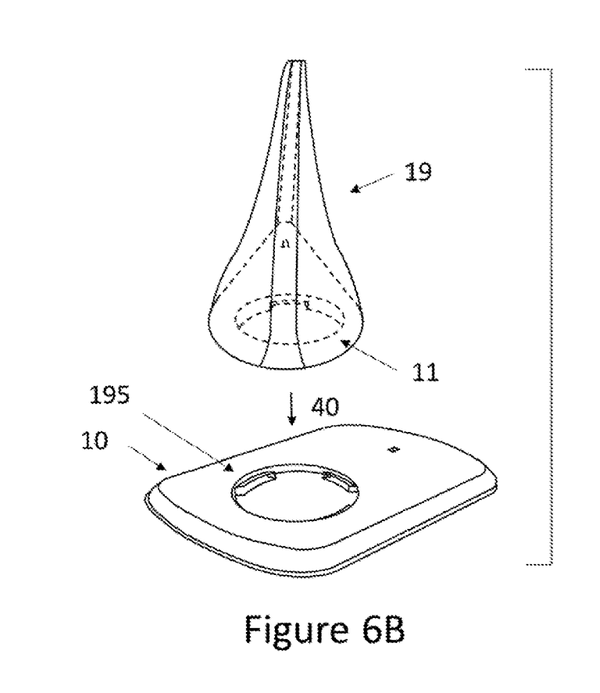
FIG. 6B is a perspective view of the base and display object of FIG. 1 with the display object positioned appropriately for insertion into the base.
Figure 6C:
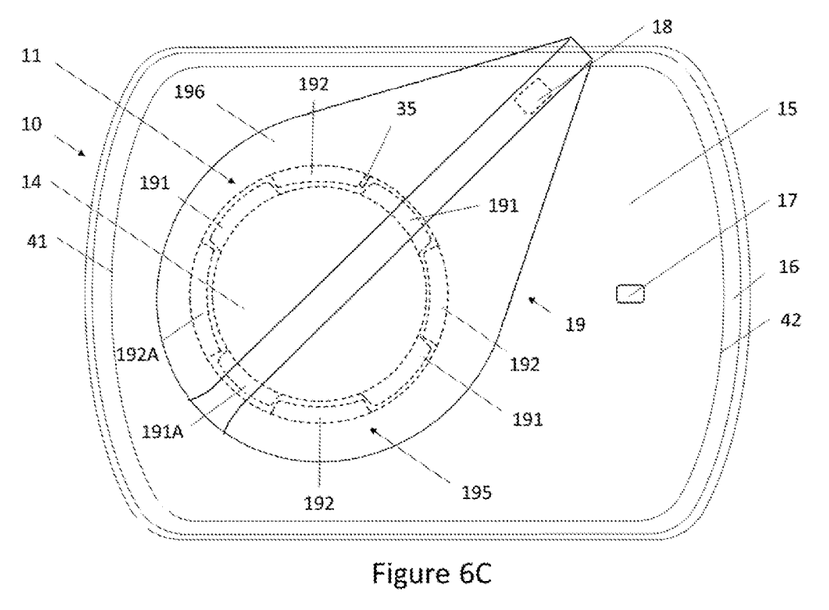
FIG. 6C is a top plan view of the base and display object of FIG. 1 with the display object positioned in the initial engagement position following insertion.
Figure 6D:
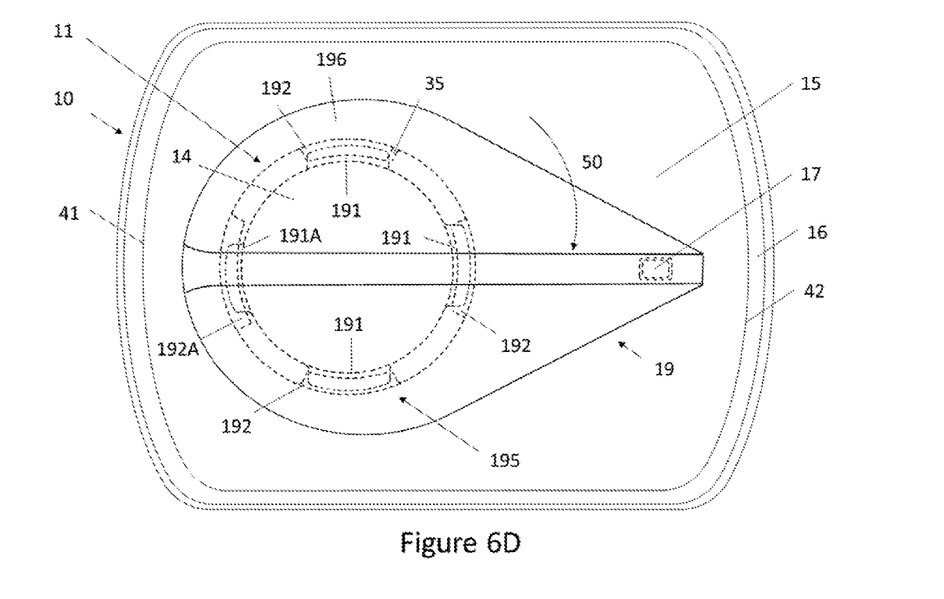
FIG. 6D is a top plan view of the base of FIG. 1 showing the ornament connection assembly following insertion and rotation into the fully engaged position.

The display object 19 comprises the art ornament 196 with the flat lower surface 12, detent notch 18, and cylindrical projection 13 with a plurality of cylindrical projection tabs 191 and 191A. The shape of the flat lower surface 12 varies to match to lower cross-section of the art ornament 196 forming an integrally connected joined edge. To connect the display object 19 and associated art ornament 196 for display, the display object connection assembly 11 is initially inserted into the base connection assembly 195 as shown in FIGS. 6A, 6B and 6C, and rotated so that the cylindrical projection tabs 191 and 191A engage with the recessed receiving cavity tabs 192 and 192A as shown in FIG. 6D. Arrows 30 and 40 depict the motion of insertion and arrow 50 depicts the motion of rotation.

The interlocking tabs 191, 191A, 192, and 192A are keyed to ensure proper alignment of the display object connection assembly 11 with the base connection assembly 195. As depicted in FIG. 6C, one cylindrical projection tab 191A is shorter than the others and one recessed receiving cavity tab 192A is longer than the others.

When rotated to the full engagement position as shown in FIG. 6D the detent protuberance 17 on the base 10 engages with the detent notch 18 on the flat lower surface 12 of the display object 19 and the user receives tactile feedback that the display object 19 is properly aligned with the base 10 for use. Once engaged, the detent protuberance 17 and detent notch 18 help to hold the display object 19 in the fully engaged position providing additional resistance to external forces associated with wind or vehicle motion that could force the display object connection assembly to rotate back toward the initial position. Note that the detent protuberance 17 can alternatively be fabricated as a round, raised nub, and detent notch 18 as a mating hole.

Figure 2:
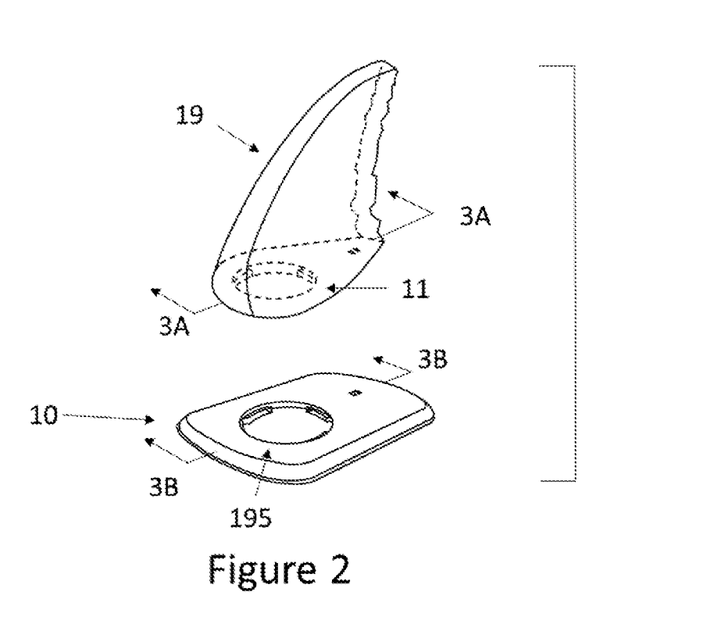
FIG. 2 is a perspective view of the display system of FIG. 1 identifying the sectioning planes and view directions used in FIGS. 3A and 3B.

Various other Figures show other aspects of this embodiment. For example, FIG. 2 shows a perspective view of the display system including section lines 3A-3A and 3B-3B which identify the sectioning planes and view directions used in FIGS. 3A and 3B respectively. FIG. 3A is a cross section view of the display object 19 taken at the sectioning plane and in the direction indicated by section lines 3A-3A in FIG. 2. This view reveals the lightweight hollow construction of the display object 19.

FIG. 3B is a cross section view of the base 10 taken at the sectioning plane and in the direction indicated by section lines 3B-3B in FIG. 2. A plurality of magnets 31 are maximally dispersed, e.g., placed in a respective corner region of the base, under the base 10 to stabilize the display system when mounted on vehicle rooftops. The magnets 31 are each connected with a threaded connector 37 to a base extension 33 with embedded insert 38. A compressible rubber grommet 34 is positioned between each magnet 31 and the associated base extension 33 to allow for limited movement of the magnets 31 accommodating the curvature of vehicle rooftops. Among other things, this configuration of distributed magnets when mounted on vehicle rooftops establishes a desirable foundational stability to resist moment loads and forces induced on the base 10 and the display object 19 by wind and driving motion.

A stop wall 35 is connected to one or more of the recessed receiving cavity tabs 192 to limit the motion of the display object connection assembly 11 when it is inserted into the base connection assembly 195 and rotated into the fully engaged position. The stop wall 35 stops the motion of the ornament connection assembly 11 in the same rotational position where the detent protuberance 17 engages the detent notch 18.

Figure 5:
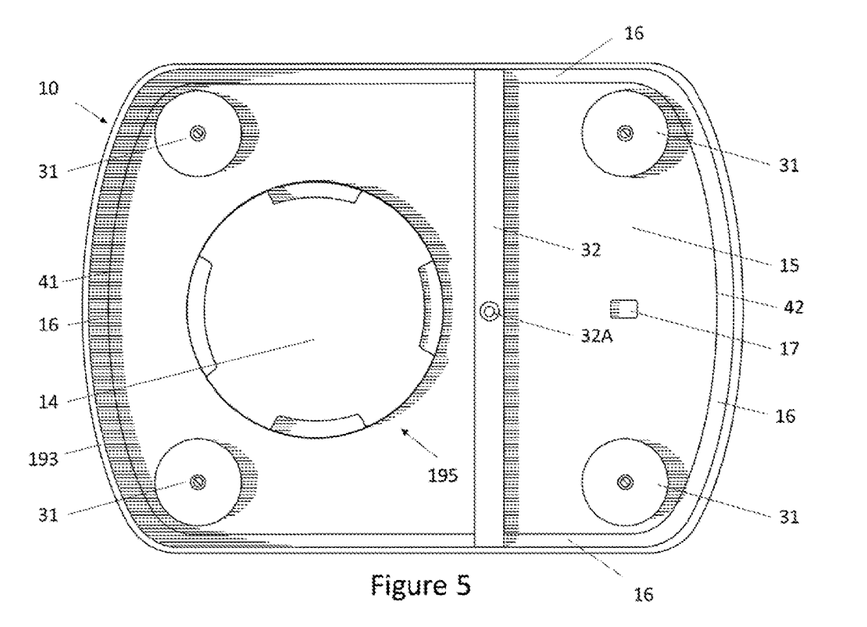
FIG. 5 is a bottom view of the base of FIG. 1 including the bottom of the recessed receiving cavity, the magnets, and the stiffener.

As shown in FIGS. 3B and 5, a stiffener 32 is attached to the underside of the base 10 to enhance the stiffness of the base 10. This contributes to the rigidity of the overall display system which better facilitates use of the display object 19 as a lever when removing the display system from the vehicle rooftop. The stiffener 32 also supports an anchor point 32A for a detachable security strap 194. The security strap 194 inhibits theft and works with the magnets to prevent undesired separation of the display system from the vehicle rooftop under extreme conditions.

Figure 4:
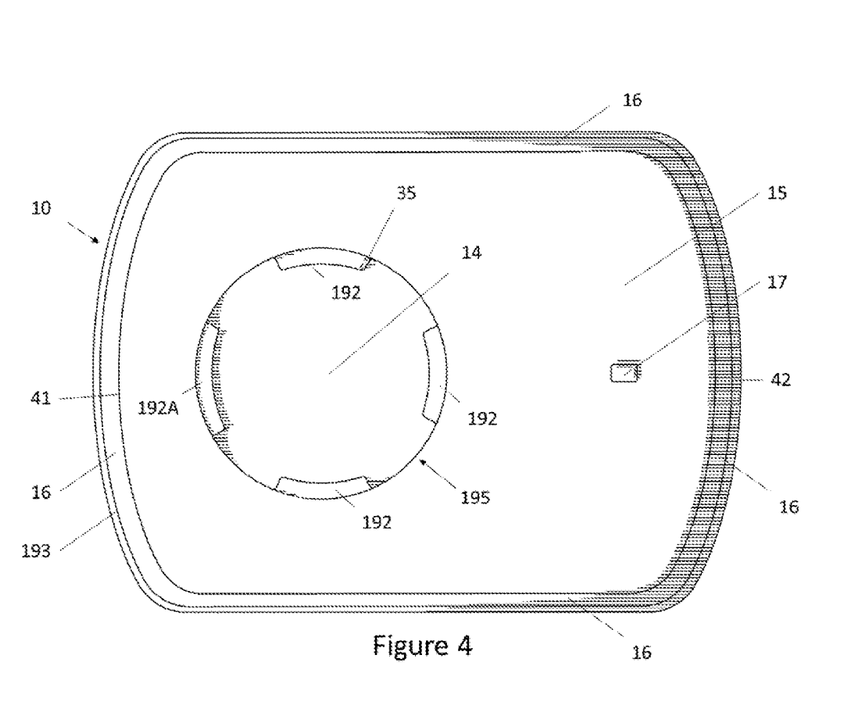
FIG. 4 is a top plan view of the base of FIG. 1 including the top of the recessed receiving cavity.

FIG. 4 depicts the top view of the base 10 including a view down into the recessed receiving cavity 14. This view depicts a plurality of recessed receiving cavity tabs 192 including the one tab 192A that is longer than the others to support the keyed connection of the display object 19 to the base 10. FIG. 5 depicts the bottom view of the base 10 including the underside of the flat base platform 15, the curved sides 16, an outwardly bowed front surface of the base 41, an outwardly bowed back surface of the base 42, the recessed receiving cavity 14, the plurality of magnets 31, the detent protuberance 17, the gasket 193, the stiffener 32, and the anchor point 32A for the security strap 194. In this context, an "outwardly bowed surface" refers to the shape of the surfaces 41 and 42 as curved from the front and rear edge, respectively, of the base platform 15.

FIGS. 6A and 6B depict the relative position between the display object 19 and the base 10 for insertion of the display object 19 into the base 10. The display object 19 is lowered into the base 10 as indicated by arrows 30 and 40. FIG. 6A also depicts the slight curvature of the lower edge of the base 10 allowing the base to better conform to the curvature of the vehicle rooftop. FIG. 6C provides a top view depicting the initial engagement position of the display object 19 relative to the base 10 when the display object connection assembly 11 is first inserted. The display object connection assembly 11 and base connection assembly 195 are hidden in this view and are shown in dashed lines.

FIG. 6D depicts a top view of the display system with the display object connection assembly 11 and base connection assembly 195 in dashed lines in the full engagement position. Arrow 50 illustrates the relative motion between the display object 19 and the base 10 that occurs when the display object 19 is rotated from the initial engagement position to the full engagement position. In the full engagement position, the detent protuberance 17 engages the detent notch 18 and one or more cylindrical projection tabs 191 make contact with an associated stop wall 35 in the base 10.

In the full engagement position, the cylindrical projection tabs 191 and 191A are sandwiched between the recessed receiving cavity tabs 192 and 192A and the floor of the recessed receiving cavity 14. This position places the entire upper and lower surface areas of the cylindrical projection tabs 191 and 191A in contact with the base 10 to transfer forces and loads from the display object 19 to the base 10 in a distributed fashion.

Thus, according to this embodiment, the arrangement of holding tabs 191, 191A, 192, and 192A connected to the cylindrical projection 13 and to the recessed receiving cavity 14 form an interlocking keyed mating configuration. This keyed mating configuration guides the insertion of the cylindrical projection 13 to the proper initial engagement position in the recessed receiving cavity 14. The stop wall 35 in the recessed receiving cavity 14 unambiguously terminates the rotation once the display object 19 is in the full engagement position. In this position, the full upper and lower surfaces of all holding tabs are in contact with portions of the base providing a strong and reliable connection. A detent device formed by the detent protuberance 17 on the flat base platform 10 and a detent notch 18 on the display object 19 engages when the display object 19 is in the full engagement position and clenches the display object 19 in that position. The resistance provided by the detent device coupled with the stop wall 35 lets the user know positively that the display object 19 is in the full engagement position and ready for use.

Figure 7:
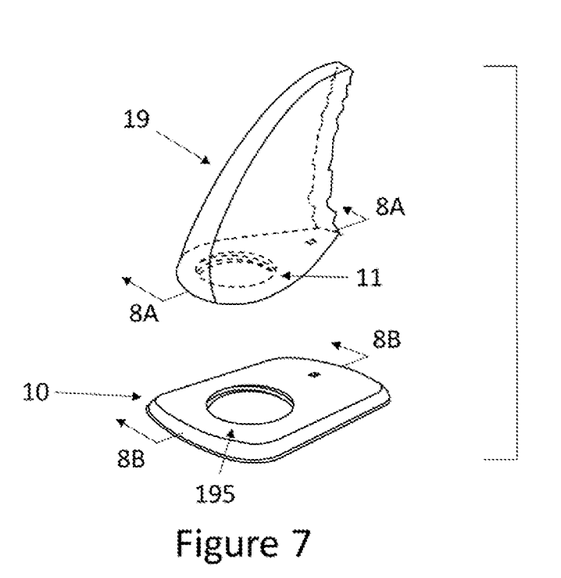
FIG. 7 is a perspective view of the display system using a threaded connection in accordance with another embodiment. This view identifies the sectioning planes and view directions used in FIGS. 8A and 8B.
Figure 8A:
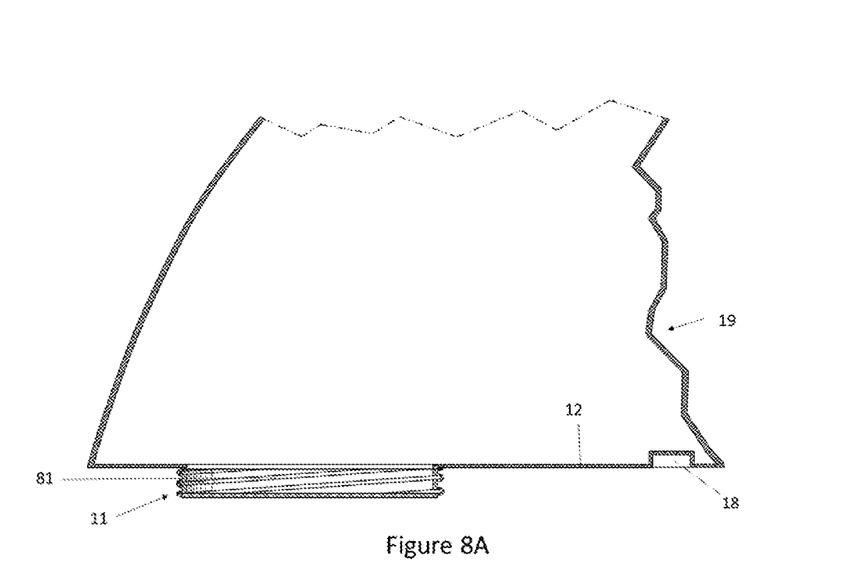
FIG. 8A is a cross section view of the display object using a threaded connection in accordance with the embodiment of FIG. 7. This cross section view is taken at the sectioning plane and in the direction indicated by section lines 8A-8A in FIG. 7.
Figure 8B:
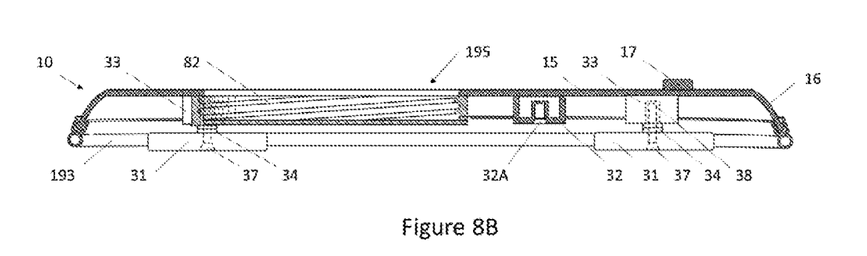
FIG. 8B is a cross section view of the base using a threaded connection in accordance with the embodiment of FIG. 7. This cross section view is taken at the sectioning plane and in the direction indicated by section lines 8B-8B in FIG. 7.

A second embodiment of the display system is illustrated in FIGS. 7, 8A, and 8B. Therein the same reference numerals are used to refer to structural elements in the second embodiment which are the same or similar to correspondingly numbered elements from the embodiment of FIGS. 1 through 6D. However, this embodiment utilizes a threaded connection to secure the display object 19 to the base 10. Similar to the first embodiment, a simple insert and rotate motion can be used to accomplish a secure connection without use of tools. In the second embodiment, interlocking tabs are replaced by complementary interlocking threads on a threaded cylindrical projection 81 and a threaded recessed receiving cavity 82. A stop wall 35 is not needed in this second embodiment because the threads are used to unambiguously limit the rotation of the display object 19. The base 10 and/or the display object 19 of the second embodiment of the display system may be produced using a variety of fabrication methods but is well suited to injection molding.

More specifically, the second embodiment utilizes an alternative display object connection assembly and base connection assembly as the means for fittingly connecting the display object 19 and the base 10. The display object connection assembly 11 employs a threaded cylindrical projection 81. The base connection assembly 195 employs a mating threaded recessed receiving cavity 82. The connection assemblies cooperate to establish a snug fit with significant contact surface area between said display object 19 and said base 10 to distribute load and transmit external forces encountered by the art ornament 196. FIG. 8A depicts a cross section view of the display object 19 taken at the sectioning plane and in the direction indicated by section lines 8A-8A in FIG. 7, including a threaded cylindrical projection 81. The threads in this embodiment replace the cylindrical projection tabs 191 and 191A in the previous embodiment as the means of connection between the display object 19 and the base 10. FIG. 8B depicts a cross section view of the base taken at the sectioning plane and in the direction indicated by section lines 8B-8B in FIG. 7, including a threaded recessed receiving cavity 82 designed to accept the threaded cylindrical projection 81. In all other ways, FIGS. 8A and 8B are the same as FIGS. 3A and 3B.

As will be appreciated by those skilled in the art, other alternative means of connecting the display object 19 to the base 10 can be employed including spring loaded tabs, ball locks, and sliding locking bars. These alternative means of connection are not depicted in the figures.

Figure 9:
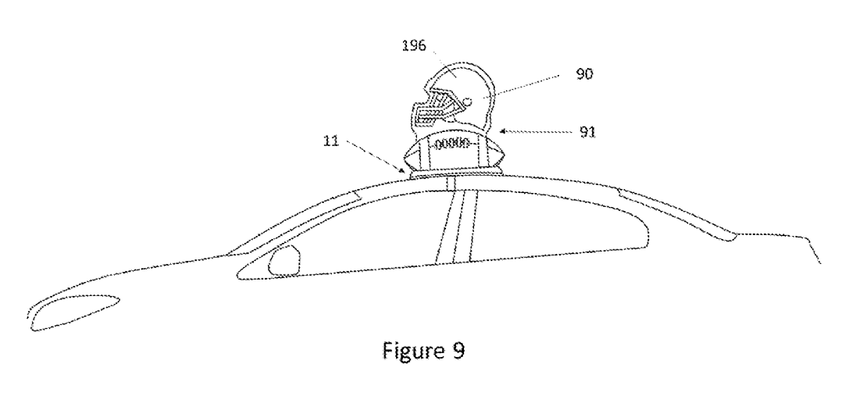
FIG. 9 is a side view of the display system of FIG. 1 or FIG. 7 showing another display object. The exemplary art ornament depicted is a football helmet perched atop a truncated football.

Whereas FIG. 1 depicts a shark fin as an example of a type of art ornament 196 which can be removably mounted on a vehicle by way of these embodiments, FIG. 9 depicts a side view of the display system with an alternative art ornament (football and football helmet) 90 to convey to the reader the interchangeability of the display objects and re-usability of the base 10 of the display system in accordance with some embodiments. This view depicts the display system as it would appear in use. When assembled for use, the means of connecting the display object 91 to the base 10 is concealed from view and thus the view of FIG. 9 is accurate for either of the previously described embodiments.

From the foregoing, it will be appreciated that the embodiments enable flexible messaging. Interchangeability of the display object 19 and associated art ornaments 196 and 90 allows users to incorporate a variety of appropriate and distinctive shapes into the communication of their messages. Compared to vehicle displays that use common, simple shapes such as rectangles and triangles, the shape of the interchangeable display objects 19 can quickly convey meaning even when viewed briefly on a moving vehicle. The shape can either be the primary means of communicating a message or the shape can complement applied text or images.

Additionally, the embodiments provide for an economic approach to flexible messaging. A reusable base 10 can be used to display a variety of interchangeable display objects 19. This flexibility allows users to communicate different moods and messages at different times without purchasing a new display system or modifying the manner in which the display is secured to the vehicle. Compared to using multiple single-assembly alternatives, reusing a single base 10 for multiple art ornaments 19 reduces overall costs, avoiding a repurchase of expensive components such as the magnets 31.

Moreover, the embodiments support the display of grander sized art ornaments 196 on a moving vehicle by virtue of a combination of features including one or more of a large footprint base 10 with maximally dispersed magnets 31, a means of connection between the display object 19 and base 10 that provides a significant surface area for transmitting load, a security strap 194, a substantially lightweight and hollow design, and a generally aerodynamic shape with a low center of gravity. The grander size makes the display more noticeable and memorable for viewers.

Further, the embodiments specifically support display on personal vehicles rather than commercial vehicles, addressing the sensitivities and concerns of many vehicle owners. These aspects include a compressible rubber gasket 193 attached to the lower perimeter of the base 10 and magnets 31 with a soft covering that protects against abrasion of painted metal surfaces. The lower perimeter of the base 10 is slightly contoured to better conform to the curvature of a vehicle rooftop. In combination, these aspects hide the magnets 31 and underside of the base 10 from view supporting a substantially aesthetic and streamlined appearance, considerations which are particularly important to some users when mounting the display system on their personal vehicle. The display object connection assembly 11 and base connection assembly 195 are concealed from view when a display object 19 is connected to the base 10, also supporting a substantially aesthetic and streamlined appearance. Separation of the interchangeable display objects 19 from the base 10 makes the display system more compact for storage when not in use.

Still further, the embodiments support unassisted use by individual users with a wide range of skills and abilities. For example, at least some embodiments include a means of connecting the display object 19 to the base 10 that involves a simple insert and turn motion and avoids a need for tools. Another aspect is a sturdy means of connecting the display object 19 and the base 10 that supports use of the display object 19 as a lever when dismounting the display system from a vehicle rooftop. This reduces the physical strength needed by a user to release the grip of the magnets 31.

The embodiments also support a temporary yet strong and unambiguous connection between the display object 19 and the base 10.

Although an interchangeable connection between the display object 19 and the base 10 is described and illustrated herein, those skilled in the art will also appreciate that other embodiments contemplate the display object 19 and base 10 being integrally formed together. In addition to depicting previously described embodiments, the view of FIG. 9 is also accurate for depicting an integrally formed embodiment. In this embodiment, since the display object 19 and the base 10 are integrally formed together, certain previously described connection components such as the display object connection assembly 11, base connection assembly 195, detent protuberance 17, and detent notch 18; are replaced by this alternative connecting method.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and assemblies of the present embodiments are described in the embodiments in particular combinations, each feature or assembly can be used alone without the other features and assemblys of the embodiments or in various combinations with or without other features and assemblys disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A display system comprising:
 a base having a plurality of magnets attached thereto and distributed around a perimeter of the base;
 a flat base platform forming a planar upper structural surface of said base;
 curved sides connected to the perimeter of the base and flat base platform forming a skirt around said flat base platform, wherein portions of a lower edge of said curved sides are contoured to accommodate curvature of a vehicle rooftop to which said base can be attached via said plurality of magnets; and
 a display object which is directly and removably connected to the flat base platform;
 wherein said removable display object further comprises a flat lower surface and a display object connection assembly which are integrally formed as part of the removable said display object;
 wherein the base platform includes a base connection assembly, which base connection assembly further comprises a recessed receiving cavity connected to said flat base platform, disposed in a longitudinal centerline axis of said base;
 wherein said display object connection assembly comprises a cylindrical projection integral with said flat lower surface;
 wherein an outer surface area of said curved sides is less than an outer surface area of said flat base platform;
 wherein said display object connection assembly and said base connection assembly are concealed from view when said display object is connected to said base.

2. The display system of claim 1, wherein said plurality of magnets are each disposed inside a respective corner of said base, and are each connected to an underside of said base platform, such that said plurality of magnets extend below the lower edge of said curved sides.

3. The display system of claim 1, further comprising:
 a compressible gasket connected to the lower edge of said curved sides and extending approximately to a same height of said plurality of magnets' bottom surfaces.

4. The display system of claim 1, further comprising:
 a detent protuberance wherein said detent protuberance is disposed atop said flat base platform; and
 a detent notch formed in a bottom portion of said display object, wherein said detent protuberance mates with said detent notch when said display object is fully engaged with said base.

5. The display system of claim 1, further comprising:
 a security strap anchor point connected to an underside of said base platform wherein said display system can be fixedly secured using a tie-down security strap.

6. The display system of claim 5, wherein said security strap anchor point is disposed on a stiffener which extends transversely from one side of the base to the other side of the base.

7. The display system of claim 1, further comprising:
 the display object connection assembly disposed at a lower portion of said display object, said display object connection assembly enabling connection of said display object to the base through engagement with the at least one base connection assembly of said flat base platform.

8. The display system of claim 7, wherein the display object connection assembly includes:
 the flat lower surface, wherein said flat lower surface is integrally joined with an art ornament at outer edges of said flat lower surface
 a cylindrical projection, wherein said cylindrical projection connects to the flat lower surface and protrudes downward from said flat lower surface; and
 a detent notch, wherein said detent notch matingly receives a detent protuberance formed in said flat base platform when the display object is in full engagement position.

9. The display system of claim 8, further comprising:
 a plurality of engaging devices connected to said cylindrical projection; and
 a plurality of mating engaging devices connected to said recessed receiving cavity;
 wherein said engaging devices and said mating engaging devices cooperate to establish a connecting fit between said connection assembly and said base to distribute load and transmit external forces encountered by said display object.

10. The display system of claim 1, further comprising a stop wall disposed in the recessed receiving cavity to limit the motion of the display object when it is fully engaged with the base.

11. The display system of claim 1, wherein the base includes an outwardly bowed front surface and an outwardly bowed back surface.

12. A display system kit comprising:
 (a) a base having a plurality of magnets attached thereto and distributed around a perimeter of the base; a flat base platform forming a planar upper structural surface of said base; and curved sides connected to the perimeter of the base forming a skirt around said flat base platform, wherein portions of a lower edge of said curved sides are contoured to accommodate curvature of a vehicle rooftop to which said base can be attached via said plurality of magnets; and
 (b) a display object which is directly and removably connectable to the flat base platform,
 wherein said removable display object further comprises a flat lower surface and a display object connection assembly which are integrally formed as part of the removable said display object;
 wherein the base platform includes a base connection assembly, which base connection assembly further comprises a recessed receiving cavity connected to said flat base platform, disposed in a longitudinal centerline axis of said base;
 wherein said display object connection assembly comprises a cylindrical projection integrally with said flat lower surface;
 wherein an outer surface area of said curved sides is less than an outer surface area of said flat base platform;

wherein said display object connection assembly and said base connection assembly are concealed from view when said display object is connected to said base.

13. The display system kit of claim 12, wherein said plurality of magnets are each disposed inside a respective corner of said base, and are each connected to an underside of said base platform, such that said plurality of magnets extend below the lower edge of said curved sides.

14. The display system kit of claim 12, further comprising:
   a compressible gasket connected to the lower edge of said curved sides and extending to approximately the same height as the plurality of magnets bottom surface.

15. The display system kit of claim 12, further comprising:
   a detent protuberance wherein said detent protuberance is disposed atop said flat base platform; and
   a detent notch formed in a bottom portion of said display object, wherein said detent protuberance mates with said detent notch when the display object is fully engaged with the base.

\* \* \* \* \*